(12) United States Patent
Hsu et al.

(10) Patent No.: US 10,416,392 B2
(45) Date of Patent: Sep. 17, 2019

(54) OPTICAL ADAPTER (71) Applicant: ADVANCED-CONNECTEK INC., New Taipei (TW)

(72) Inventors: Huan-Pin Hsu, New Taipei (TW); Chih-Jen Hsiao, New Taipei (TW)

(73) Assignee: ADVANCED-CONNECTEK INC., New Taipei (TW)

( * ) Notice: Subject to any disclaimer, the term of this patent is extended or adjusted under 35 U.S.C. 154(b) by 0 days.

(21) Appl. No.: 16/242,653

(22) Filed: Jan. 8, 2019

(65) Prior Publication Data
US 2019/0212502 A1 Jul. 11, 2019

(30) Foreign Application Priority Data

Jan. 9, 2018 (TW) ............................. 107200393 U (51) Int. Cl.
G02B 6/38 (2006.01)

(52) U.S. Cl.
CPC ......... *G02B 6/3849* (2013.01); *G02B 6/3825* (2013.01)

(58) Field of Classification Search
CPC ............................ G02B 6/3825; G02B 6/3849
USPC .......................................................... 385/75
See application file for complete search history.

(56) References Cited

U.S. PATENT DOCUMENTS

| | | | | |
|---|---|---|---|---|
| 5,363,460 A * | 11/1994 | Marazzi | ............... | G02B 6/3825 385/55 |
| 6,039,585 A * | 3/2000 | Kim | ................... | H01R 13/5219 385/139 |
| 7,182,524 B2 * | 2/2007 | Kramer | ................ | G02B 6/3825 385/53 |
| 9,128,255 B2 * | 9/2015 | Sato | ...................... | G02B 6/3893 |
| 9,128,256 B2 * | 9/2015 | Miller | .................. | G02B 6/3849 |
| 2003/0002816 A1 * | 1/2003 | De Marchi | .......... | G02B 6/3825 385/78 |
| 2005/0078914 A1 * | 4/2005 | Cox | ...................... | G02B 6/3897 385/55 |
| 2009/0028498 A1 * | 1/2009 | Cheng | .................. | G02B 6/3849 385/15 |
| 2011/0038581 A1 * | 2/2011 | Mudd | .................. | G02B 6/3849 385/53 |
| 2012/0195555 A1 * | 8/2012 | Jibiki | .................. | G02B 6/3825 385/75 |
| 2013/0084041 A1 * | 4/2013 | Lin | ...................... | G02B 6/3825 385/56 |

(Continued)

*Primary Examiner* — Sung H Pak
(74) *Attorney, Agent, or Firm* — Muncy, Geissler, Olds & Lowe, P.C.

(57) ABSTRACT

An optical adapter includes a base body, a shutter member, and a supporting base. The shutter member is pivotally connected at an insertion opening of the base body. The supporting base is assembled on a bottom portion of the base body. A surface of the supporting base has an abutting piece inside the base body. One of two ends of the abutting piece includes a fixing portion fixed on the supporting base, and the other end of the abutting piece includes an abutting portion obliquely extending toward the shutter member to abut against a back surface of the shutter member. Therefore, the supporting base can be assembled on the bottom of the base body conveniently. Furthermore, when the abutting piece is pushed and compressed by the shutter member, the abutting piece is not prone to have excessive deformation, prevent the abutting piece from being deformed or damaged easily.

10 Claims, 7 Drawing Sheets

(56) References Cited

U.S. PATENT DOCUMENTS

2014/0205239 A1* 7/2014 Sato .................... G02B 6/3849
  385/55
2015/0078710 A1* 3/2015 Sato ..................... G02B 6/241
  385/78
2018/0329153 A1* 11/2018 Verheyden ........... G02B 6/3893

* cited by examiner

OPTICAL ADAPTER

CROSS-REFERENCE TO RELATED APPLICATION

This non-provisional application claims priority under 35 U.S.C. § 119(a) to Patent Application No. 107200393 in Taiwan, R.O.C. on Jan. 9, 2018, the entire contents of which are hereby incorporated by reference.

FIELD OF THE INVENTION

The instant disclosure relates to an adapter, and more particular to an optical adapter.

BACKGROUND

In the optical fiber fields, signals are in pairs and matched with each other, one for transmitting, and one for receiving. Optical transmission tools for optical fibers may be used to connect several short optical fibers with each other to form a long optical fiber. The optical transmission tools may be also used for connecting the optical fiber to an active component, e.g., a light source or a detector or to a passive component, e.g., a light switch or an attenuator.

An optical fiber connector can be aligned the core of the optical fiber with the optical path of a connecting component. Hence, the optical fiber in the optical fiber connector can be coupled to the optical path of the connecting component. The optical fiber is detachably inserted into an adapter. In order to prevent dusts entering into the adapter to damage or affect the optical fiber inside the adapter when the adapter is not plugged by the connector, a shutter member is provided.

SUMMARY OF THE INVENTION

However, in the adapter known to the inventor(s), the shutter member is pivotally connected to the inner walls of the adapter through shafts at two sides of the shutter member. Moreover, springs or elastic pieces may be fitted over the shafts for providing a resilient force after the shutter member is notated. In an L-shaped elastic piece known to the inventor(s), one of two ends of the elastic piece is abutted against the back of the shutter member, and the other end of the elastic piece is abutted against a bottom cover of the adapter. As a result, the adapter known to the inventor(s) needs the bottom cover for abutted against the elastic piece, thus in the cost and the assembling procedure for the adapter, the cost and the assembling procedure for the back cover are additionally included. Moreover, in the assembling, the L-shaped elastic piece has to pass through the through hole on the shutter member and thus cannot be assembled on the shutter member in a convenient manner. Furthermore, in operation, the one end of the elastic piece is compressed toward the other end of the elastic piece, and the compression angle is so large, meaning that the compression torque is huge, that the corner of the elastic piece may have excessive deformation and break.

In view of these, an embodiment of the instant disclosure provides an optical adapter comprising a base body, a shutter member, and a supporting base. One of two ends of the base body comprises an insertion opening. One side of the base body comprises a through groove communicating with the insertion opening. The base body comprises assembling portions respectively on two side walls of the base body to shield the insertion opening. The shutter member is pivotally connected to the two side walls of the base body to shield the insertion opening. Two sides of the supporting base comprise engaging portions assembled to the assembling portions. A surface of the supporting base comprises an abutting piece inside the through groove. One of two ends of the abutting piece comprises a fixing portion fixed on the supporting base, and the other end of the abutting piece comprises an abutting portion obliquely extending toward the shutter member to abut against a back surface.

In one embodiment, a surface of the shutter member comprises a recessed portion recessed inwardly toward the through groove, and the abutting portion at the other end of the abutting piece abuts against a rear side of the recessed portion.

In one embodiment, the abutting portion forms a curved plane to abut against a corner between the recessed portion and the shutter member.

In one embodiment, the supporting base and the abutting piece are integrated as a whole piece, and the abutting piece is obliquely extending from the surface of the supporting base toward the shutter member.

In one embodiment, the supporting base and the abutting piece are assembled components, the surface of the supporting base comprises an engaging recess, and a buckling piece is protruding from the abutting piece to engage with the engaging recess.

In one embodiment, the surface of the supporting base comprises a baffling block to abut against the buckling piece.

In one embodiment, the abutting piece comprises a folded piece extending outwardly from the fixing portion to engage with a bottom surface of the supporting base.

In one embodiment, the abutting piece is made of a metallic material with thermal treatments.

In one embodiment, each of the assembling portions has an insertion hole at a bottom portion of the respective side wall, and each of the engaging portions has a positioning post protruding from the surface of the supporting base mated with the respective insertion hole.

In one embodiment, the other end of the base body comprises a mating opening and a slidable rail, wherein the optical adapter further comprises a component assembly inserted into the slidable rail to be positioned inside the base body.

As above, according to some embodiments of the instant disclosure, the supporting base can be assembled on the bottom of the base body in a convenient manner, to allow the abutting piece to be abutted against the back surface of the shutter member. Therefore, the assembly can be achieved in a convenient and easy manner, and the shutter member can be adapted to providing dustproof purposes. Furthermore, in the embodiment, the abutting piece is abutted against the back surface of the shutter member. Hence, when the abutting piece is pushed and compressed by the shutter member, the compression torque of the abutting piece is small. Therefore, the abutting piece is not prone to have excessive deformation, preventing the abutting piece from being deformed or damaged easily.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

Figure 1:
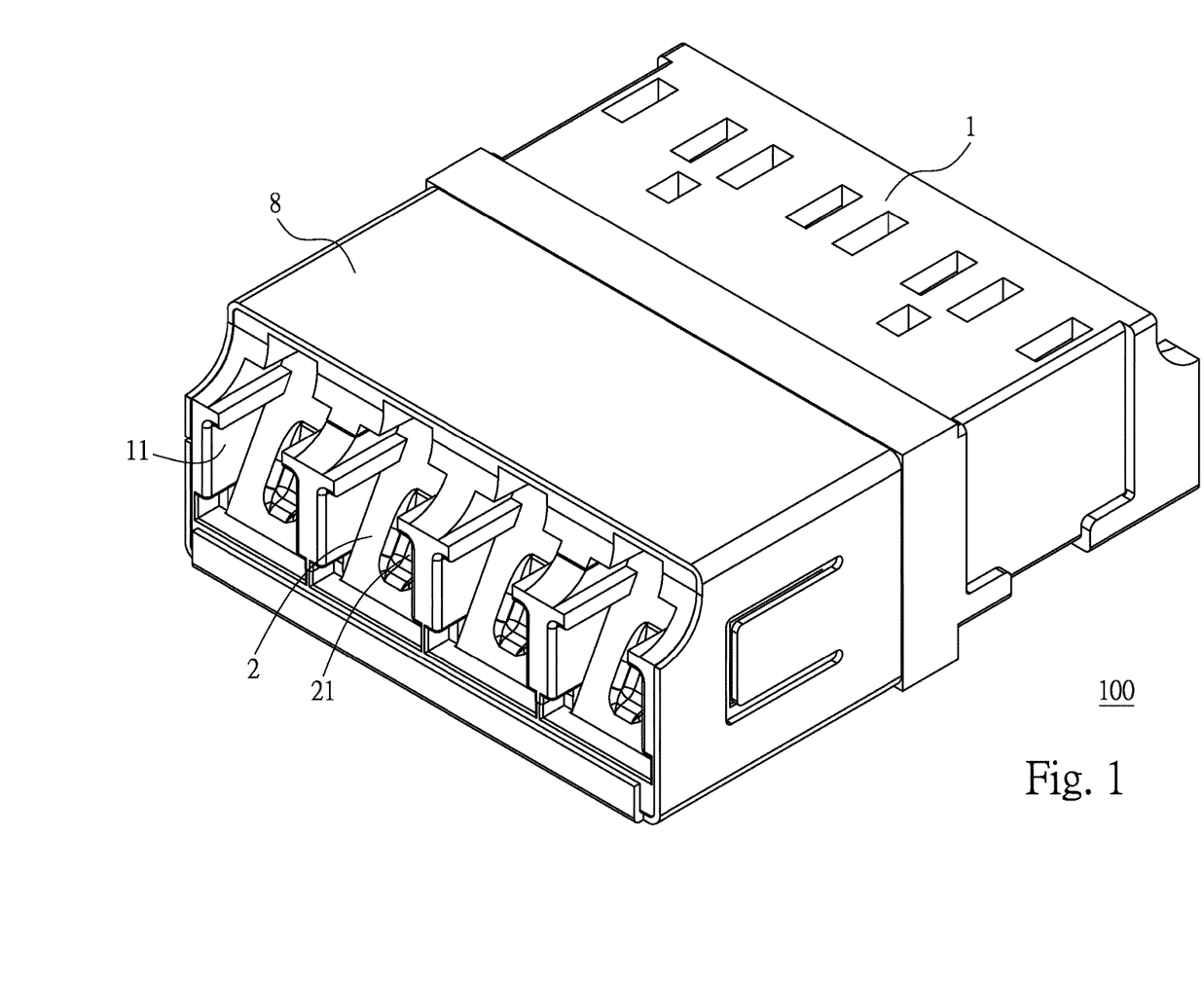
FIG. 1 illustrates a perspective view of an optical adapter according to an exemplary embodiment of the instant disclosure.
Figure 2:
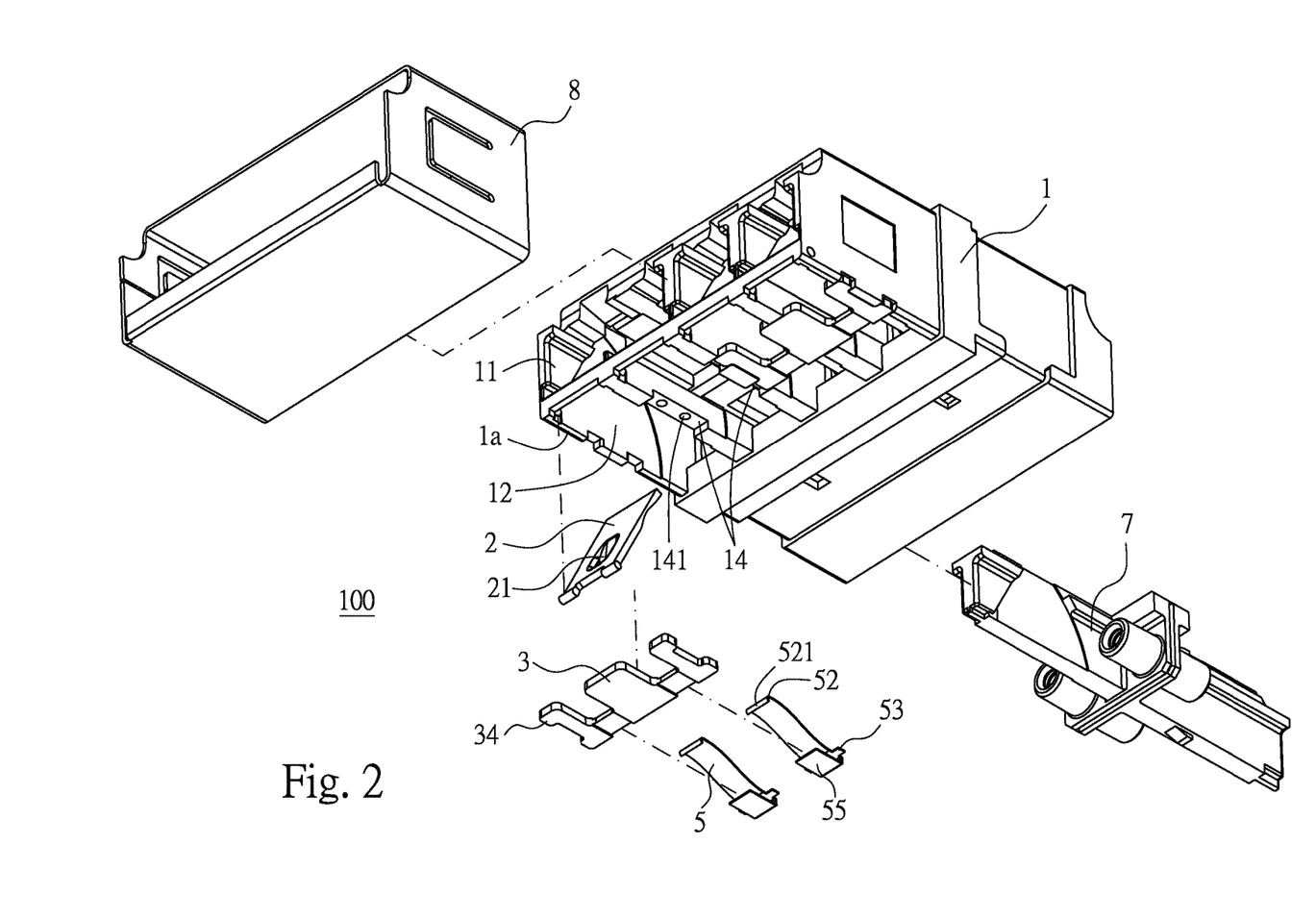
FIG. 2 illustrates an exploded view (1) of the optical adapter.
Figure 3:
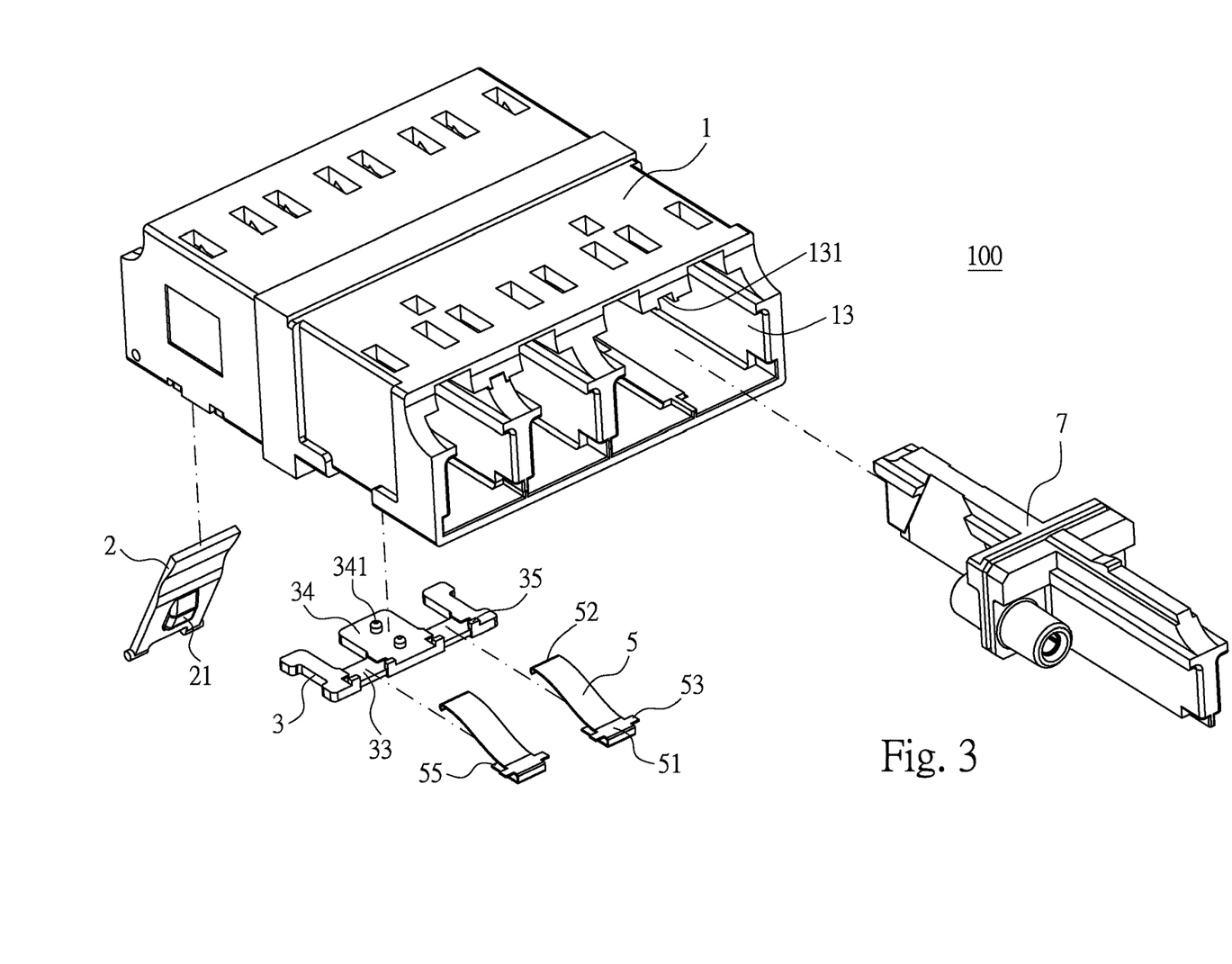
FIG. 3 illustrates an exploded view (2) of the optical adapter.
Figure 4:
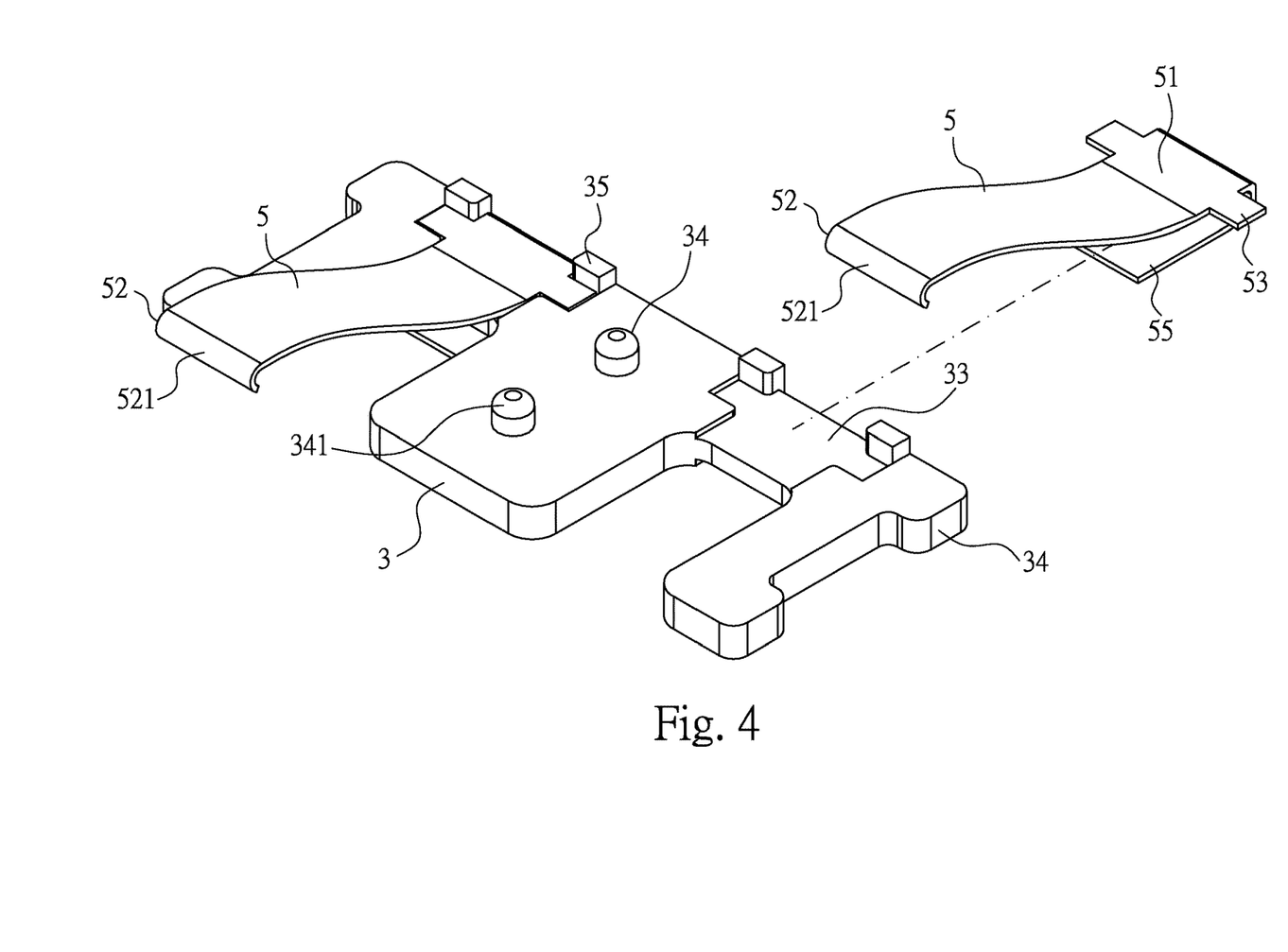
FIG. 4 illustrates an exploded view of a supporting base and an abutting piece of the optical adapter.
Figure 5:
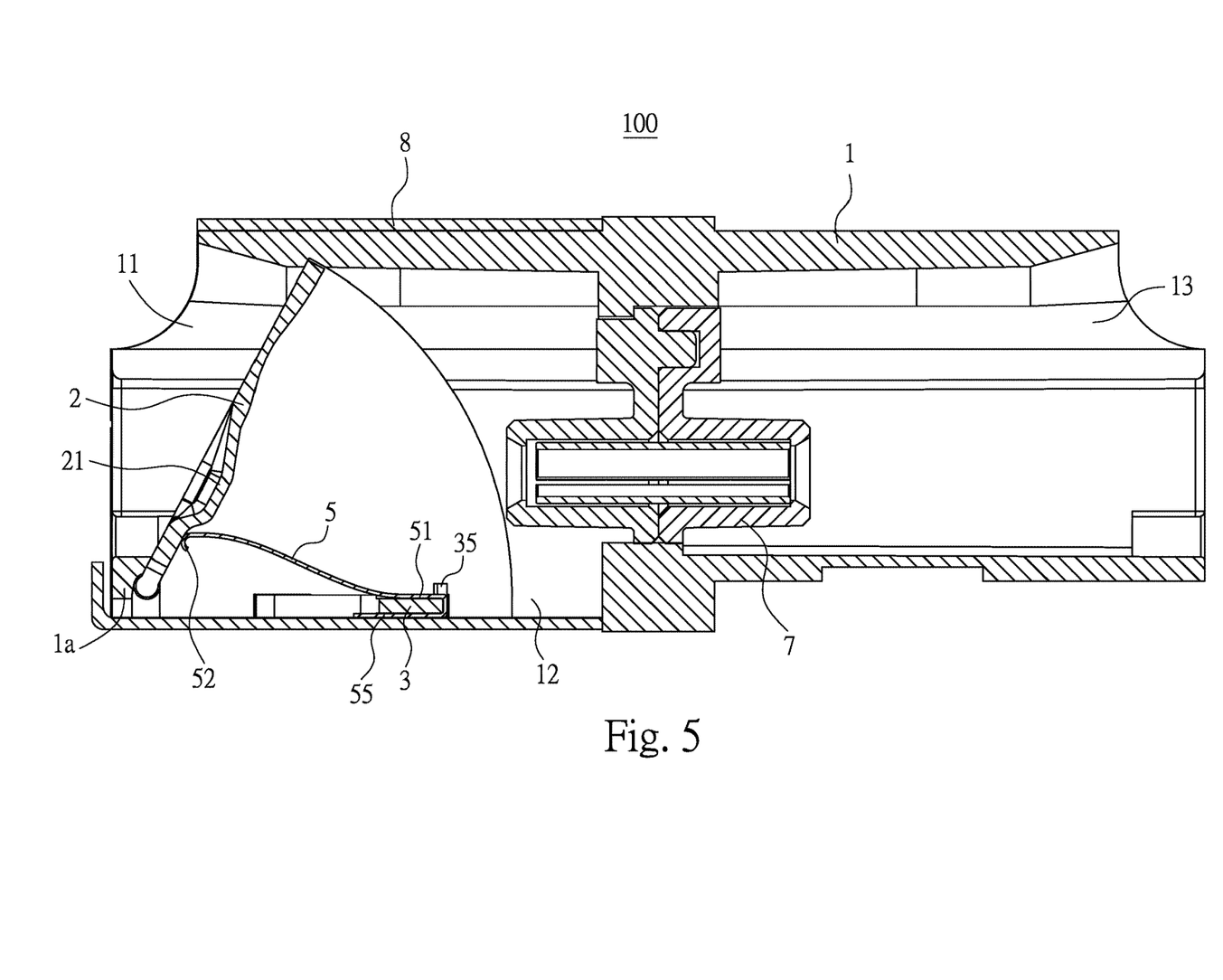
FIG. 5 illustrates a lateral sectional view of the optical adapter.

Please refer to FIGS. 1 to 5, illustrating an optical adapter 100 of an exemplary embodiment according to the instant disclosure. FIG. 1 illustrates a perspective view of the optical adapter. FIG. 2 illustrates an exploded view (1) of the optical adapter. FIG. 3 illustrates an exploded view (2) of the adapter. FIG. 4 illustrates an exploded view of a supporting base 3 and an abutting piece 5 of the optical adapter. FIG. 5 illustrates a lateral sectional view of the optical adapter. In this embodiment, the optical adapter 100 is provided for being inserted by several optical connectors (not shown). In this embodiment, the optical adapter 100 comprises a base body 1, a shutter member 2, and a supporting base 3. In this embodiment, one of two ends of the base body 1 comprises a plurality of insertion openings 11, and the other end of the base body 1 comprises a plurality of mating openings 13, but embodiments are not limited thereto. In one embodiment, one end of the base body 1 comprises an insertion opening 11, and the other end of the base body 1 comprises a mating opening 13. Hence, two optical fiber connectors can be respectively inserted into the insertion opening 11 and the mating opening 13. In one embodiment, the optical adapter 100 comprises a housing 8 for covering the base body 1.

Please refer to FIGS. 1 to 5. In this embodiment, the base body 1 is a hollowed shell in rectangular shape. One end of the base body 1 (the front end) comprises an insertion opening 11, and one side of the base body 1 (the bottom portion) comprises a through groove 12 communicating with the insertion opening 11. The base body 1 comprises assembling portions 14 respectively on two side walls 1a at two sides of the through groove 12. Each of the assembling portions 14 has an insertion hole 141 and a slot at a bottom portion of the respective side wall 1a.

Please refer to FIGS. 1 to 5. In this embodiment, the other end of the base body comprises a mating opening and a slidable rail. The optical adapter further comprises a component assembly inserted into the slidable rail to be positioned inside the base body. Hence, when the component assembly is inserted into the base body, the component assembly can be stably positioned with the optical adapter. Moreover, the assembling between the component assembly and the optical adapter is convenient for users.

Figure 6:
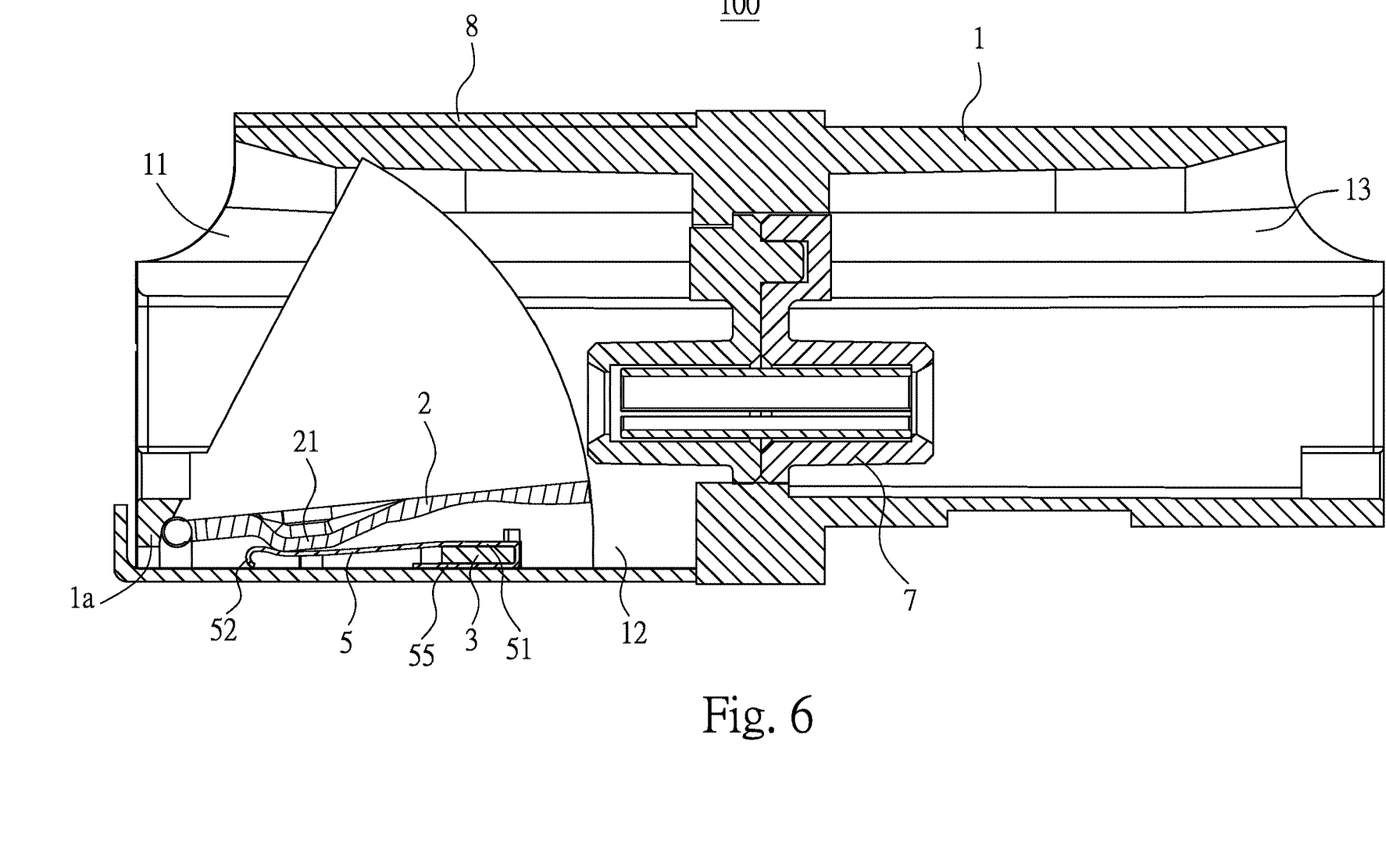
FIG. 6 illustrates a lateral sectional view showing that the shutter member does not shield the insertion opening of the optical adapter according to one embodiment.

Please refer to FIGS. 1 to 6. FIG. 6 illustrates a lateral sectional view showing that the shutter member 2 does not shield the insertion opening 11 of the optical adapter 100. In this embodiment, the shutter member 2 is pivotally connected to the two side walls 1a of the base body 1 to shield the insertion opening 11. The shutter member 2 is a rectangular plate, and the size of the shutter member 2 is matched with the size of the insertion opening 11. The shutter member 2 is disposed on the insertion opening 11 for dustproof purposes. In one embodiment, when an optical fiber connector inserts into the insertion opening 11, the fiber core at the front end of the optical fiber connector abuts against the shutter member 2, so that the shutter member 2 is rotated with a shaft portion at the bottom portion of the shutter member 2 as a rotation center, and the shutter member 2 is deflected toward the base body 1. In consequence, the optical fiber connector is positioned in the base body 1.

Please refer to FIGS. 1 to 5. In this embodiment, a surface of the shutter member 2 has a recessed portion 21, that is, the surface of the shutter member 2 comprises a recessed portion 21 recessed inwardly toward the through groove 12. When the optical fiber connector inserts into the insertion opening 11, the fiber core at the front end of the optical fiber connector abuts against a back surface of the recessed portion 21, but embodiments are not limited thereto. In some embodiments, the shutter member 2 may be a flat plate. Hence, when the optical fiber connector inserts into the insertion opening 11, the fiber core at the front end of the optical fiber connector is in contact with the surface of the shutter member 2, so that the shutter member 2 can also be abutted against the optical fiber connector and the shutter member 2 is deflected toward the base body 1.

Please refer to FIGS. 1 to 5. In this embodiment, the supporting base 3 is a plastic block. Two sides of the supporting base 3 comprise engaging portions 34 assembled to the assembling portions 14. In this embodiment, each of the engaging portions 34 has a positioning post 341 protruding from the surface of the supporting base 3 mated with the respective insertion hole 141, and each of the engaging portions 34 has protruding blocks at the two sides of the supporting base 3 mated with the respective recesses. In one embodiment, the assembling portions 14 and the engaging portions 34 may be positioned with each other in an interference fitted manner.

Please refer to FIGS. 1 to 5. In this embodiment, a surface of the supporting base 3 comprises an abutting piece 5 inside the through groove 12. In this embodiment, the supporting base 3 and the abutting piece 5 are assembled components. That is, in this embodiment, the supporting base 3 and the abutting piece 5 are separated components and can be assembled with each other. The abutting piece 5 is made of a metallic material with thermal treatments, so that the structural strength of the abutting piece 5 is improved. Furthermore, the surface of the supporting base 3 comprises an engaging recess 33, and a buckling piece 53 is protruding from a side portion of the abutting piece 5 to engage with the engaging recess 33. The surface of the supporting base 3 comprises a baffling block 35 to abut against the buckling piece 53. Hence, the buckling piece 53 is not detached from the supporting base 3.

Figure 7:
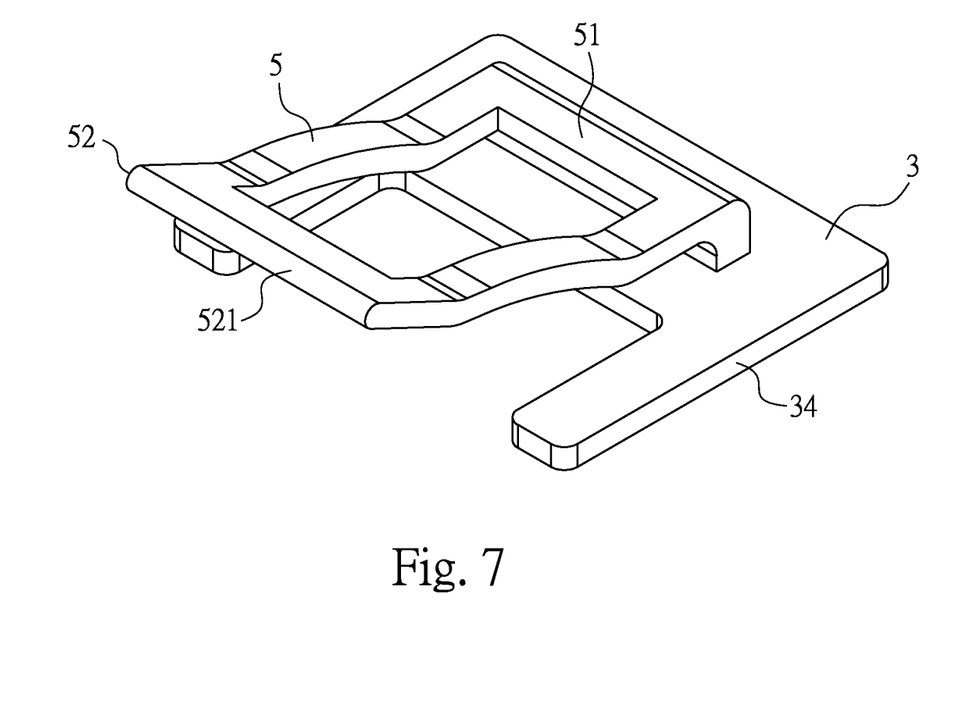
FIG. 7 illustrates a perspective view of another embodiment of the supporting base and the abutting piece of the optical adapter.

In the foregoing embodiments, the supporting base 3 and the abutting piece 5 are assembled components, but embodiments are not limited thereto. In one embodiment, as shown in FIG. 7, which illustrates a perspective view of another embodiment of the supporting base 3 and the abutting piece 5 of the optical adapter, the supporting base 3 and the abutting piece 5 are integrated as a whole piece. The supporting base 3 and the abutting piece 5 may be made of a plastic material, and the supporting base 5 is obliquely extending from the surface of the supporting base 3 toward the shutter member 2.

Please refer to FIGS. 1 to 5. In this embodiment, one of two ends of the abutting piece 5 comprises a fixing portion 51 fixed on the supporting base 3, and the other end of the abutting piece 5 comprises an abutting portion 52 obliquely extending toward the shutter member 2 to abut against a back surface of the shutter member 2. Furthermore, the abutting portion 52 forms a curved plane 521 to abut against a corner between the recessed portion 21 and the shutter member 2.

Please refer to FIGS. 1 to 5. In this embodiment, the abutting piece comprises a folded piece extending outwardly from the fixing portion to engage with a bottom surface of the supporting base. In other words, the shape of the cross-section of the abutting piece is approximately a laid-V shape, as shown in FIG. 2

Please refer to FIGS. 1 to 6. In this embodiment, when the optical fiber connector is unplugged off the insertion opening 11, the back surface of the shutter member 2 is abutted against the abutting portion 52 of the abutting piece 5, and the originally-compressed abutting portion 52 is rebounded. Hence, the shutter member 2 is pushed by the abutting portion 52 to move back to the position to shield the insertion opening 11 for preventing dust into the adapter.

As above, according to some embodiments of the instant disclosure, the supporting base can be assembled on the bottom of the base body in a convenient manner, to allow the abutting piece to be abutted against the back surface of the shutter member. Therefore, the assembly can be achieved in a convenient and easy manner, and the shutter member can be adapted to providing dustproof purposes. Furthermore, in the embodiment, the abutting piece is abutted against the back surface of the shutter member. Hence, when the abutting piece is pushed and compressed by the shutter member, the compression torque of the abutting piece is small. Therefore, the abutting piece is not prone to have excessive deformation, preventing the abutting piece from being deformed or damaged easily.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An optical adapter, comprising:
   a base body, wherein one of two ends of the base body comprises an insertion opening, one side of the base body comprises a through groove communicating with the insertion opening, the base body comprises assembling portions respectively on two side walls at two sides of the through groove;
   a shutter member pivotally connected to the two side walls of the base body to shield the insertion opening; and
   a supporting base, wherein two sides of the supporting base comprise engaging portions assembled to the assembling portions, a surface of the supporting base comprises an abutting piece inside the through groove, one of two ends of the abutting piece comprises a fixing portion fixed on the supporting base, and the other end of the abutting piece comprises an abutting portion obliquely extending toward the shutter member to abut against a back surface of the shutter member.

2. The optical adapter according to claim 1, wherein a surface of the shutter member comprises a recessed portion recessed inwardly toward the through groove, and the abutting portion at the other end of the abutting piece abuts against a rear side of the recessed portion.

3. The optical adapter according to claim 2, wherein the abutting portion forms a curved plane to abut against a corner between the recessed portion and the shutter member.

4. The optical adapter according to claim 1, wherein the supporting base and the abutting piece are integrated as a whole piece, and the abutting piece is obliquely extending from the surface of the supporting base toward the shutter member.

5. The optical adapter according to claim 1, wherein the supporting base and the abutting piece are assembled components, the surface of the supporting base comprises an engaging recess, and a buckling piece is protruding from the abutting piece to engage with the engaging recess.

6. The optical adapter according to claim 5, wherein the surface of the supporting base comprises a baffling block to abut against the buckling piece.

7. The optical adapter according to claim 5, wherein the abutting piece comprises a folded piece extending outwardly from the fixing portion to engage with a bottom surface of the supporting base.

8. The optical adapter according to claim 5, wherein the abutting piece is made of a metallic material with thermal treatments.

9. The optical adapter according to claim 1, wherein each of the assembling portions has an insertion hole at a bottom portion of the respective side wall, and each of the engaging portions has a positioning post protruding from the surface of the supporting base mated with the respective insertion hole.

10. The optical adapter according to claim 1, wherein the other end of the base body comprises a mating opening and a slidable rail, wherein the optical adapter further comprises a component assembly inserted into the slidable rail to be positioned inside the base body.

* * * * *